(12) United States Patent
Legan et al.

(10) Patent No.: US 9,086,891 B2
(45) Date of Patent: Jul. 21, 2015

(54) CENTRALIZED SYSTEM TO TRANSFORM A LANGUAGE NEUTRAL STRING CONTENT INTO A FORMAT OF A DESIRED PLATFORM

(71) Applicant: Xerox Corporation, Norwalk, CT (US)

(72) Inventors: James D. Legan, Ontario, NY (US); Kevin Nuwer, Ontario, NY (US); Scott R. Stephens, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/107,737

(22) Filed: Dec. 16, 2013

(65) Prior Publication Data

US 2015/0169300 A1 Jun. 18, 2015

(51) Int. Cl.
*G06F 9/45* (2006.01)

(52) U.S. Cl.
CPC ........................................ *G06F 8/40* (2013.01)

(58) Field of Classification Search
CPC ................ G06F 8/40; G06F 8/51; G06F 8/52
See application file for complete search history.

(56) References Cited

U.S. PATENT DOCUMENTS

| | | | |
|---|---|---|---|
| 2006/0156278 A1* | 7/2006 | Reager | 717/104 |
| 2014/0304678 A1* | 10/2014 | Zhang | 717/105 |

* cited by examiner

*Primary Examiner* — Anna Deng

(57) ABSTRACT

A method, non-transitory computer readable medium, and apparatus for transforming a programming language neutral string content are disclosed. For example, the method searches for a master string needed by a component, wherein the master string comprises the programming language neutral string content including one or more pre-defined variables, subscribes the component to the master string and selects one or more profiles to transform the one or more pre-defined variables of the master string into a format of a programming language for a desired platform that uses the component.

15 Claims, 3 Drawing Sheets

CENTRALIZED SYSTEM TO TRANSFORM A LANGUAGE NEUTRAL STRING CONTENT INTO A FORMAT OF A DESIRED PLATFORM

The present disclosure relates generally to programming languages and, more particularly, to a method and an apparatus for transforming language neutral string content into a format of a desired platform.

BACKGROUND

Any one development team may produce software for a myriad of platforms. A single solution may have deliverables on Windows®, Mac OSx®, Linux®, Android®, iOS®, Windows® Phone as well as web server hosted components developed in any number of languages. The languages used to create these solutions include C++, Objective C, C, C#, JavaScript®, Ruby®, Python®, and the like.

For the most part, each of these languages implements string localization differently. Win32® C++ uses a resource file (.rc) with an accompanying header file (.h) which handles enumeration. Objective C not only has a specific format, but also has an intricate directory structure dictated by the OS and others using both standardized or proprietary XML formats.

In addition to the format of the output, the string content itself is often programming language specific. In the past, if this particular string were to be implemented in multiple software deliverables that span multiple operating systems, it would not be uncommon for it to be written differently and subsequently translated for each implementation. Thus, the same string could be translated many times, but only include a small number of unique different strings.

SUMMARY

According to aspects illustrated herein, there are provided a method, a non-transitory computer readable medium, and an apparatus for transforming a programming language neutral string content. One disclosed feature of the embodiments is a method that searches for a master string needed by a component, wherein the master string comprises the programming language neutral string content including one or more pre-defined variables, subscribes the component to the master string and selects one or more profiles to transform the one or more pre-defined variables of the master string into a format of a programming language for a desired platform that uses the component.

Another disclosed feature of the embodiments is a non-transitory computer-readable medium having stored thereon a plurality of instructions, the plurality of instructions including instructions which, when executed by a processor, cause the processor to perform an operation that searches for a master string needed by a component, wherein the master string comprises the programming language neutral string content including one or more pre-defined variables, subscribes the component to the master string and selects one or more profiles to transform the one or more pre-defined variables of the master string into a format of a programming language for a desired platform that uses the component.

Another disclosed feature of the embodiments is an apparatus comprising a processor and a computer readable medium storing a plurality of instructions which, when executed by the processor, cause the processor to perform an operation that searches for a master string needed by a component, wherein the master string comprises the programming language neutral string content including one or more pre-defined variables, subscribes the component to the master string and selects one or more profiles to transform the one or more pre-defined variables of the master string into a format of a programming language for a desired platform that uses the component.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for transforming a programming language neutral string content. As discussed above, one development team may be required to produce software for a myriad of different platforms. For example, a single software solution may need to be transforming in multiple different programming languages and then each different programming language may need to be translated into multiple different foreign speaking languages.

However, the strings of each one of the different programming languages can be generalized to include common content and one or more variables that are formatted specifically for the respective programming language. In addition, the same strings can be used for different software solutions or components.

In one embodiment, the present disclosure provides a master string that may be written in a programming language neutral string content having one or more variables or pre-defined variables. Components developed for a particular platform may then subscribe to one or more master strings needed for the component. The components may include one or more profiles specific to the programming language of the desired platform to translate the one or more variables of the master string into a proper format of the programming language of the desired platform.

As a result, master strings may be recycled and subscribed to by a plurality of components rather than having to re-create the same master string over and over again. In addition, the master string may be transforming into different programming languages and translated into different foreign speaking languages by simply selecting one or more existing profiles that transforms the variables of the master string. If a necessary master string or profile is not available, new master strings and profiles may be added as needed such that other components may subscribe to the newly created master strings or select the newly created profiles.

Figure 1:
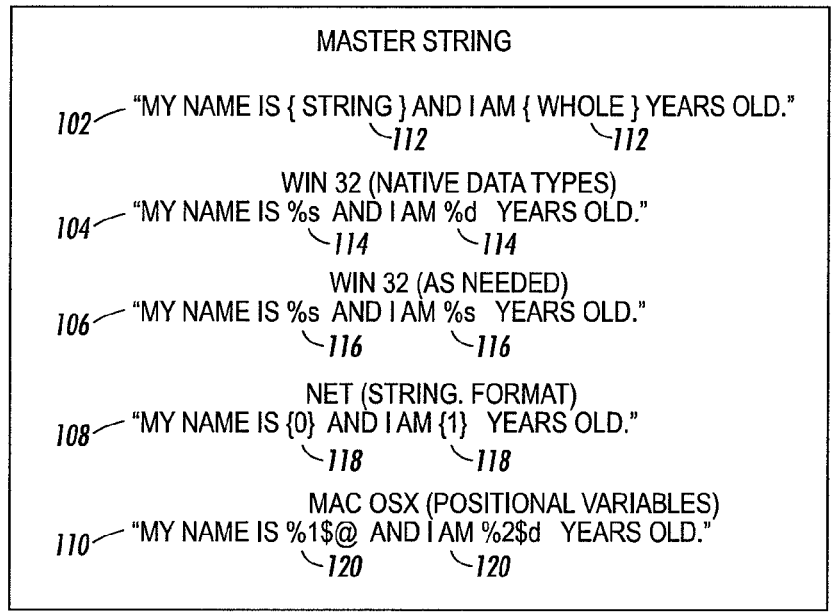
FIG. 1 illustrates an example of a master string and corresponding translations for various programming languages.

FIG. 1 illustrates an example of a master string 102 created from a plurality of different strings 104, 106, 108 and 110 written for specific programming languages. For example, the master string 102 comprises "My name is {STRING} and I am {WHOLE} years old!" The master string may include one or more variables 112 (e.g., {STRING} and {WHOLE}). In one embodiment, the one or more variables 112 in the master string may be written in a generic or programming language neutral way. As will be discussed below, without the one or more profiles selected by the component, the component cannot process the master string 102 because it is written as a programming language neutral string content.

In one embodiment, the variables 112 may correspond to programming specific variables 114 of the string 104, variables 116 of the string 106, variables 118 of the string 108 and variables 120 of the string 110. In one embodiment, the variables 112 may include at least one of: a fraction, a large fraction, a whole number, a large whole number, a string, a new line, a hot key, a tab, a decorator or a special character.

As illustrated in FIG. 1, the string 104 is written specifically for a WIN 32® (native data types) implementation. The string 106 is written specifically for a WIN 32® (as needed) implementation. The string 108 is written specifically for a .NET (STRING.FORMAT) implementation. The string 110 is written specifically for a Mac OS X (positional variables) implementation. However, the strings 104-110 each has a common format that can be written generically to include constant text "My name is . . . and I am . . . years old!" The strings 104-110 also include a variable for a string and a variable for a whole number. Thus, the master string 102 is written in a natural language form that is not programming language specific as "My name is {STRING} and I am {WHOLE} years old!"

Depending on a programming language required by a desired platform, one or more profiles may be selected by the component to transforms the variables 112 of the master string 102 into a proper format. In addition, for different programming languages, the same string does not need to be re-written by a development team several times for each one of the different programming languages. Rather, the components of the different platforms using different programming languages may simply subscribe to the master string 102 and be configured with different profiles that are applied to the master string 102.

Figure 2:
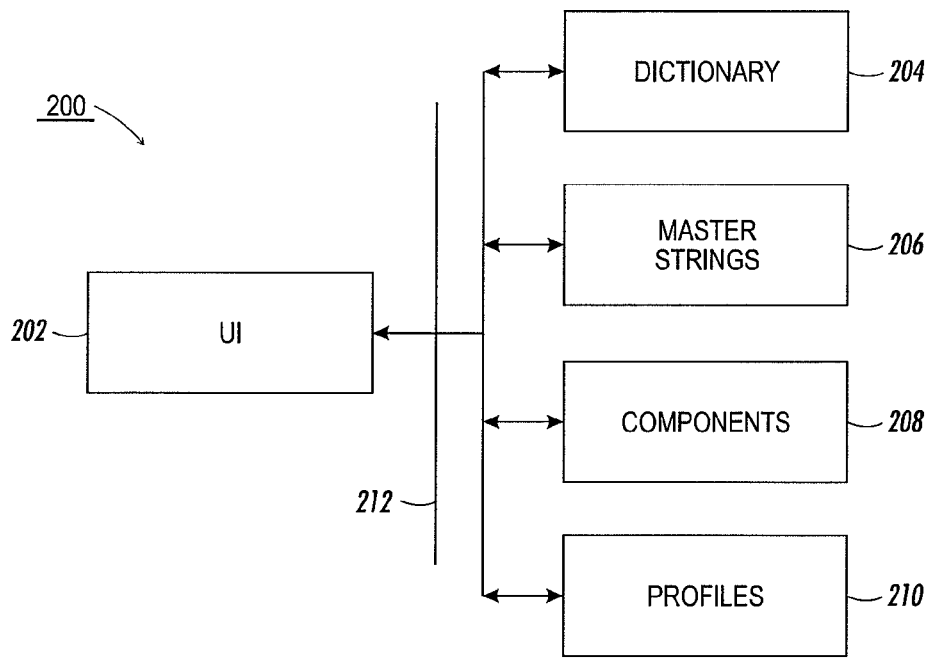
FIG. 2 illustrates an example system block diagram transforming a programming language neutral string content.

FIG. 2 illustrates an example system 200 for translating a programming language neutral string content or the master string 102. In one embodiment, the system 200 may include a user interface (UI) 202 that may be part of a general purpose computer including a processor and memory as described below and illustrated in FIG. 4. The user interface 202 may be a graphical user interface for searching for master strings, creating new master strings, creating new profiles, selecting profiles for a component, creating a subscription to a master string for a component, and other functions described herein. The layout and design of the user interface 202 may include any layout and design capable of conveying or displaying the information disclosed herein or performing or achieving the functions described herein.

In one embodiment, the system 200 may include one or more modules that are used by the user interface 202 to perform the translation. The user interface 202 may be located remotely from the modules as illustrated by a demarcation line 212. In another embodiment, the user interface 202 and the modules may be part of a single hardware device, computer or server.

In one embodiment, the one or more modules may include a dictionary module 204, a master strings module 206, a components module 208 and a profiles module 210. In one embodiment, the dictionary module 204 may store a plurality of definitions for each one of the plurality of variables that are used by the master strings. The plurality of definitions may provide a list of the recognized variables that can be used in the master strings and a default translation for each one of the plurality of variables used by a default profile. The definitions stored in the dictionary module 204 may be selected by profiles to create a profile that transforms the defined variables to a different programming language. For example, the ampersand special character {&} may be defined for a default programming language to be interpreted as an escaped ampersand ("&&"). However, a profile may change the interpretation of the ampersand from the default translation into a translation for a different programming language as discussed below.

In one embodiment, the master strings module 206 may store one or more master strings (e.g., the master string 102). The master string module 206 may store all of the existing master strings and provide for each existing master string a component key, a component file configuration, a date the master string was created, and the like. In one embodiment, the master string module 206 may also provide information regarding a total number of subscriptions for each master string including details of the name of the components that are included in the subscriptions and the different languages. The master string module 206 may also include tabs in the user interface 202 for displaying comments, displaying attachments (e.g., a picture to provide context for the deployment of the master string), displaying a history of the master string and a displaying a life cycle of the master string.

In one embodiment, the user interface 202 may be used to search the master string module 206 for a particular master string. In addition, the user interface 202 may be used to create a new master string if no matching master string is found.

In one embodiment, the components module 208 may include information regarding all of the created components. The information may include which components are subscribed to which master strings, which profiles are selected by the components, and the like. For a component to subscribe to a master string, the subscription may require some information. The required subscription information may include, for example, a key which will be used to reference the component, a name of the component for which the subscription is being created, a file which will contain a content or output of the component, one or more profiles selected for the component (as discussed below) and a context (e.g., a how and a where the master string will be used in the component). In one embodiment, subscriptions can be edited, deleted and moved to a new master string via the user interface 202.

In one embodiment, the profiles module 210 may include one or more created profiles that transforms the defined variables in the dictionary module 204 into a desired format of a different programming language. For example, an HTML ampersand profile may be created for a hypertext markup language (HTML) programming language that would transform the ampersand {&} to "&" in HTML instead of an escaped ampersand ("&&") as it would be transformed for a default profile predefined in the dictionary module 204. In another example, a Numbers As Strings profile may be created for a WIN 32® programming language that would transform number variables {WHOLE}, {LGWHOLE}, {FACXY} and {LGFRACXY} as a string % s. In another example, a Drop Colon profile may be created to drop a colon in a master string "Lan Fax Module:". Under a default profile, the colon would remain. However, under a new profile created to drop the colon for a programming language, the profile may implement {:} as an empty string. The above are only a few illustrative examples and it should be noted that many other examples of profiles may be within the scope of the present disclosure.

In one embodiment, each new created profile may include a component that is using the profile, a description of the profile, an output format, a list of one or more output files that include the name and location of the files that the content or output of the component should be placed or sent to, a list of one or more languages the component will be translated into, string variable profiles that list a brief description of each profile that is included for each variable of a master string and a history.

In one embodiment, the user interface 202 may display a profile preview window that allows a user to see how the master string will appear when the profile is applied. The preview window may allow the user to verify the profile has the intended translation before implementing the profile in the component.

As noted above, the components may include one or more profiles. In one embodiment, if a component includes a plurality of profiles, the profiles may be stacked. In one embodiment, the profiles may be stacked in an order of priority and executed in the sequence of the order. For example, if a default profile was acceptable for all of the variables in the master string except for the way an ampersand was processed, the HTML ampersand profile may be selected first and the default profile may be selected second. Thus, the HTML ampersand profile would have a higher priority over the default profile and be stacked on top of the default profile. As a result, the HTML ampersand profile would be applied first to the ampersand variable and the default profile would be applied to any remaining variables of the master string.

As a result, commonly used strings can be stored as master strings in a programming language neutral format. Profiles may be created to transform the variables of the master strings into a proper format for a programming language of a desired platform. As a result, the system of the present disclosure may transform any programming language neutral content string into a desired programming language. This saves time and money spent on manually performing millions of translations and creating duplicate strings for different programming languages.

Figure 3:
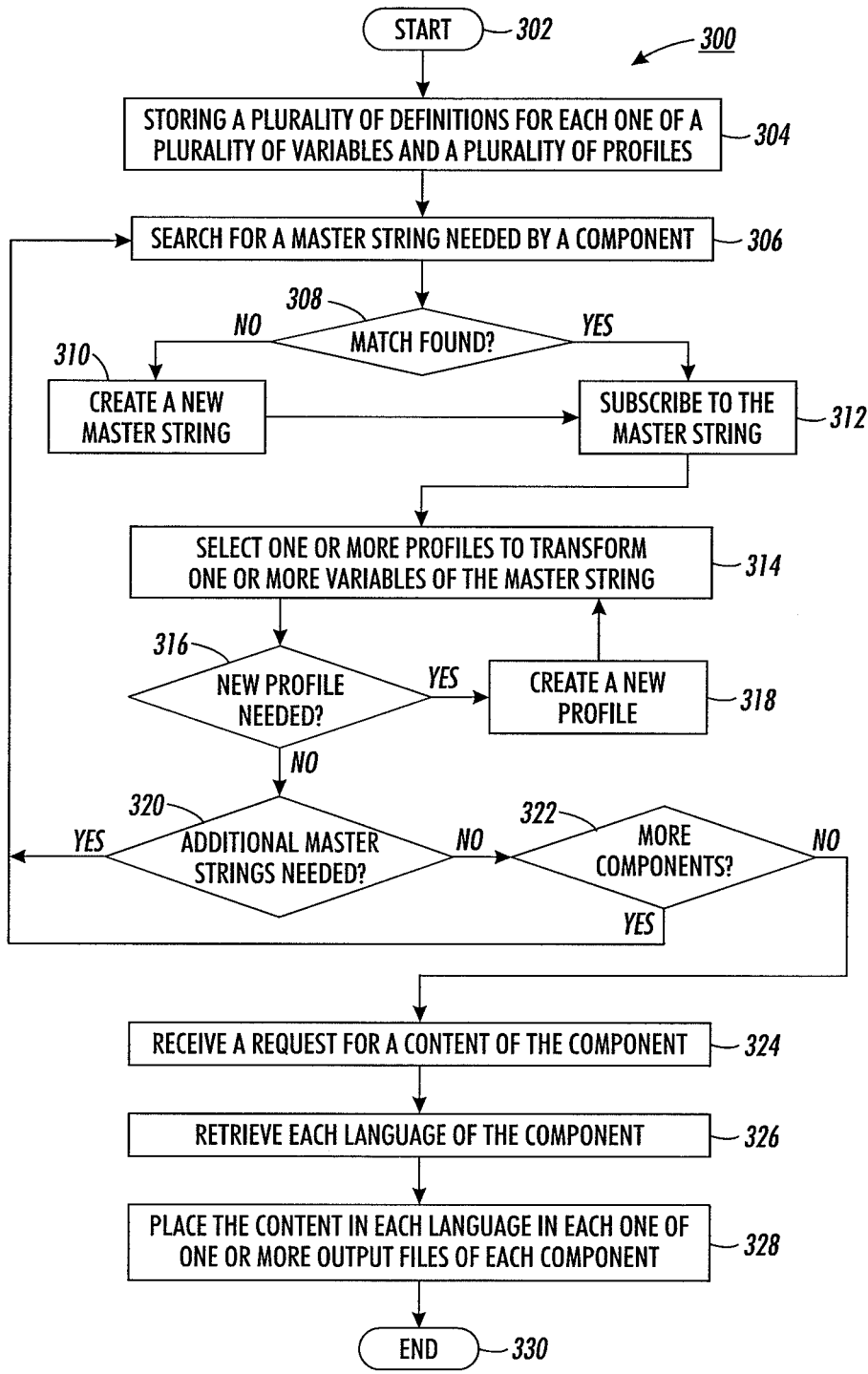
FIG. 3 illustrates an example flowchart of a method for translating a programming language neutral string content.
Figure 4:
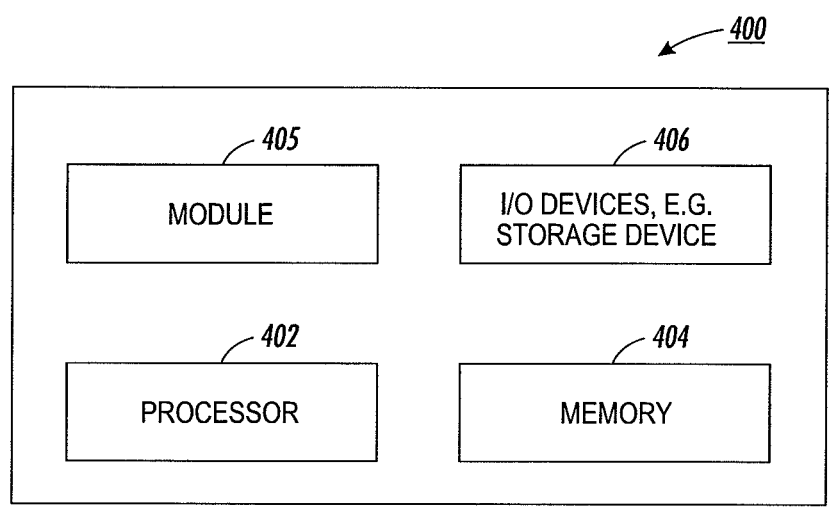
FIG. 4 illustrates a high-level block diagram of a general-purpose computer suitable for use in performing the functions described herein.

FIG. 3 illustrates a flowchart of a method 300 for transforming a programming language neutral string content. In one embodiment, one or more steps or operations of the method 300 may be performed by the system 200 or a general-purpose computer 400 as illustrated in FIG. 4 and discussed below.

The method 300 begins at step 302. At step 304, the method 300 stores a plurality of definitions for each one of a plurality of variables and a plurality of profiles. For example, a dictionary may store a plurality of definitions for recognized variables of master strings that apply a default profile. In other words, the dictionary module may include a plurality of pre-defined variables of the master strings.

In one embodiment, a profile module may store a plurality of profiles that are created for the pre-defined variables to change the way they are transformed from a default profile to a format for a programming language of a desired platform. In one embodiment, the profiles may be stacked on top of the default profile to prioritize how the pre-defined variables are transformed in the master string for a particular programming language.

At step 306, the method 300 searches for a master string needed by a component. In one embodiment, a component may be needed for a new project. Rather than creating and programming new strings for the programming language of the desired platform, the method 300 may be used to recycle and reuse existing master strings that were previously created and simply apply new profiles to transform the master string into a format for a programming language of the desired platform. As a result, time and costs associated with creating new strings are saved.

At step 308, the method 300 determines if a match for the master string was found. If a match was found, the method 300 may proceed to step 312. If no match was found, the method 300 may proceed to step 310. In other words, if no match was found at step 308, then the method 300 may have determined that the master string may not exist. At step 310, the method 300 may create a new master string.

At step 312, the method 300 may subscribe the component to the master string. For example, if a new master string was created, the component may subscribe to the newly created master string or master string that match the search. In one embodiment, to create a subscription various types of information may be required. The information may include, for example, a key which will be used to reference the component, a name of the component for which the subscription is being created, a file which will contain a content of the component, one or more profiles selected for the component (as discussed below) and a context (e.g., a how and a where the master string will be used in the component).

At step 314, the method 300 may select one or more profiles to transform one or more variables of the master string. In one embodiment, if the default profile is acceptable for all variables of the master string, the default profile stored in the dictionary module may be used. In another embodiment, if some of the variables require a different translation, then additional profiles may be selected. In one embodiment, the profiles may be selected in an order of priority that the profiles should be executed. In other words, in one embodiment, the component may process the master string in accordance with a descending order of the profiles (e.g., top down) as they are stacked.

At step 316, the method 300 may determine if a new profile is needed. For example, the currently available profiles may not have a profile to transform a particular variable of the master string into a proper format of a programming language of a desired platform. If a new profile is needed, the method 300 may proceed to step 318.

At step 318, the method 300 may create a new profile. For example, the pre-defined variables that can be used in the master strings stored in the definitions may be modified by newly created profiles to have the pre-defined variables transformed into a different format for a programming language of a desired platform. The method 300 may proceed back to 314, where the new profile is added to the one or more profiles that are available and may be selected.

Referring back to step 316, if no new profiles are needed the method 300 may proceed to step 320. At step 320, the method 300 determines if additional master strings are needed for the component. For example, the component may include multiple master strings. If additional master strings are needed, the method 300 may return to step 306. However, if no additional master strings are needed, the method 300 may proceed to step 322.

At step 322, the method 300 may determine if there are more components. For example, the method 300 may be repeated for as many components that are needed or required by an application. If there are more components, the method 300 may return to step 306 for the next component that is being configured. If there are no more components, the method 300 may proceed to step 324.

At step 324, the method 300 may receive a request for a content of the component. For example, the component may be used for a deliverable on a particular platform. The platform may request a content (e.g., an output of one of the master strings) of the component.

At step 326, the method 300 retrieves each language of the component. As noted above, the component may comprise one or more different languages. The requested content may be translated into each one of the one or more different speaking/foreign languages required by the component.

At step 328, the method 300 places the content in each language in each one of one or more output files of the component. As discussed above, the component may be configured to produce an output that is stored in one or more output files that are located in one or more predefined file locations. In one embodiment, the requested content may be translated into each one of the one or more different speaking/foreign languages and each translation may be rendered by the profiles of the component and outputted to the one or more output files. The method 300 ends at step 330.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for transforming a programming language neutral string content, and various input/output devices 406 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for transforming a programming language neutral string content can be loaded into memory 404 and executed by processor 402 to implement the functions as discussed above. As such, the present method 405 for transforming a programming language neutral string content (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of method 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for transforming one or more pre-defined variables of a programming language neutral string content, comprising:

storing, by a processor, a plurality of definitions for each one of the one or more pre-defined variables, the one or more pre-defined variables comprising at least one of: a fraction, a large fraction, a whole number, a large whole number, a string, a new line, a hot key, a tab, a decorator or a special character, and a plurality of different profiles, wherein each one of the plurality of different profiles is associated with one of a plurality of different programming languages and provides a translation for the each one of the one or more pre-defined variables that are defined for a respective one of the plurality of different programming languages;

searching, by the processor, for a master string needed by a component for a programming language of the plurality of different programming languages, wherein the component comprises one or more languages, one or more output files and one or more profiles of the plurality of profiles, wherein the master string comprises the programming language neutral string content including the one or more pre-defined variables;

subscribing, by the processor, the component to the master string;

selecting, by the processor, a profile associated with the master string to transform each one of the one or more pre-defined variables of the master string into a format of the programming language for a desired platform that uses the component, wherein the master string includes the plurality of different profiles;

receiving, by the processor, a request for a content of the component;

retrieving, by the processor, the content that is requested for each one of the one or more languages of the component; and placing, by the processor, the content that is requested in each one of the one or more languages of the component in each one of the one or more output files of the component.

2. The method of claim 1, wherein the component comprises one or more languages, one or more output files and the one or more profiles.

3. The method of claim 1, wherein the searching comprises:

determining, by the processor, that the master string does not exist; and creating, by the processor, a new master string.

4. The method of claim 1, wherein subscribing the component to the master string comprises including a key to identify the component for a subscription.

5. The method of claim 1, wherein the selecting the profile comprises creating a new profile.

6. The method of claim 1, wherein the plurality of different profiles each comprises a description, an output format, one or more file configurations for one or more output files of the component, one or more language configurations, one or more string variable profiles and a history.

7. The method of claim 1, wherein the selecting comprises selecting a plurality of profiles.

8. The method of claim 7, wherein a priority of each one of the plurality of different profiles that is applied is based on an order that the each one of the plurality of different profiles is listed.

9. A non-transitory computer-readable medium storing a plurality of instructions, which when executed by a processor, cause the processor to perform operations for transforming one or more pre-defined variables of a programming language neutral string content, the operations comprising:

storing a plurality of definitions for each one of the one or more pre-defined variables, the one or more pre-defined variables comprising at least one of: a fraction, a large fraction, a whole number, a large whole number, a string, a new line, a hot key, a tab, a decorator or a special character, and a plurality of different profiles, wherein each one of the plurality of different profiles is associated with one of a plurality of different programming languages and provides a translation for the each one of the one or more pre-defined variables that are defined for a respective one of the plurality of different programming languages;

searching for a master string needed by a component for a programming language of the plurality of different programming languages, wherein the component comprises one or more languages, one or more output files and one or more profiles of the plurality of profiles, wherein the master string comprises the programming language neutral string content including the one or more pre-defined variables;

subscribing the component to the master string; and selecting a profile associated with the master string to transform each one of the one or more pre-defined variables of the master string into a format of the programming language for a desired platform that uses the component, wherein the master string includes the plurality of different profiles;

receiving a request for a content of the component;

retrieving the content that is requested for each one of the one or more languages of the component; and placing the content that is requested in each one of the one or more languages of the component in each one of the one or more output files of the component.

10. The non-transitory computer-readable medium of claim 9, wherein the searching comprises:

determining, by the processor, that the master string does not exist; and creating, by the processor, a new master string.

11. The non-transitory computer-readable medium of claim 9, wherein subscribing the component to the master string comprises including a key to identify the component for a subscription.

12. The non-transitory computer-readable medium of claim 9, wherein the selecting the profile comprises creating a new profile.

13. The non-transitory computer-readable medium of claim 9, wherein the plurality of different profiles each comprises a description, an output format, one or more file configurations for one or more output files of the component, one or more language configurations, one or more string variable profiles and a history.

14. The non-transitory computer-readable medium of claim 9, wherein the selecting comprises selecting a plurality of profiles.

15. The non-transitory computer-readable medium of claim 14, wherein a priority of each one of the plurality of different profiles that is applied is based on an order that the each one of the plurality of different profiles is listed.

* * * * *